(12) United States Patent
Porter et al.

(10) Patent No.: US 11,956,119 B2
(45) Date of Patent: Apr. 9, 2024

(54) DEVICE, COMPUTER PROGRAM AND METHOD

(71) Applicant: SONY GROUP CORPORATION, Tokyo (JP)

(72) Inventors: Robert Mark Stefan Porter, Winchester (GB); Alan Hogg Turner, Basingstoke (GB); Gareth Sylvester-Bradley, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 282 days.

(21) Appl. No.: 17/432,643

(22) PCT Filed: Feb. 25, 2020

(86) PCT No.: PCT/GB2020/050445
§ 371 (c)(1),
(2) Date: Aug. 20, 2021

(87) PCT Pub. No.: WO2020/201683
PCT Pub. Date: Oct. 8, 2020

(65) Prior Publication Data
US 2022/0166662 A1     May 26, 2022

(30) Foreign Application Priority Data
Mar. 29, 2019 (GB) ..................... 1904427

(51) Int. Cl.
*H04L 41/0654* (2022.01)
*H04L 41/0659* (2022.01)
(52) U.S. Cl.
CPC .............. *H04L 41/0661* (2023.05)

(58) Field of Classification Search
CPC ........... H04L 41/0661; H04W 74/085; H04W 74/0841; H04W 74/0808; H04W 74/0833; H04W 74/006; H04W 52/36; H04W 48/16
See application file for complete search history.

(56) References Cited

U.S. PATENT DOCUMENTS 8,903,411 B1 * 12/2014 Reeves .............. H04M 3/42187
455/26.1
2009/0129404 A1 * 5/2009 Wu ................... H04L 12/40143
370/468

(Continued)

FOREIGN PATENT DOCUMENTS

CN       107483310 B     4/2021
EP       2 811 767 B1    11/2020
WO   WO-2014130764 A1 *  8/2014 ............. G06Q 30/08

OTHER PUBLICATIONS

International Search Report dated Apr. 24, 2020 in PCT/GB2020/050445 filed on Feb. 25, 2020.

*Primary Examiner* — Awet Haile
(74) *Attorney, Agent, or Firm* — Oblon, McClelland, Maier & Neustadt, L.L.P.

(57) ABSTRACT

A method of joining a first device and a second device with a network, the method comprising: joining a first device with the network and subsequently joining a second device with the network, where a priority level for joining with the network associated with the first device is higher than the priority level for joining with the network associated with the second device.

15 Claims, 7 Drawing Sheets

(56) References Cited

U.S. PATENT DOCUMENTS

| | | | |
|---|---|---|---|
| 2010/0027529 A1* | 2/2010 | Jackson | H04L 12/6418 |
| | | | 370/352 |
| 2011/0142031 A1 | 6/2011 | Jackson et al. | |
| 2011/0228671 A1* | 9/2011 | Tuffin | H04L 47/824 |
| | | | 370/221 |
| 2015/0039796 A1* | 2/2015 | Pinglikar | G06F 13/4282 |
| | | | 710/114 |
| 2015/0117192 A1* | 4/2015 | Zhang | H04W 76/10 |
| | | | 370/230 |
| 2017/0359151 A1* | 12/2017 | Huang | H04L 1/187 |
| 2020/0146065 A1* | 5/2020 | You | H04W 74/006 |

* cited by examiner

900

| MAC ADDRESS | Device Type | Software Serial No | Priority | IP Address | Label |
|---|---|---|---|---|---|
| 00-14-22-01-23-45 | 4K Video Camera | 4419739028 79053935 | Critical | 172.29.80.65: 12345 | Host 1 |

Stored on Device 1

| | MAC ADDRESS | Device Type | Software Serial No | Priority | IP Address | Label |
|---|---|---|---|---|---|---|
| Device 1 | | | | | | |
| | 00-14-22-01-23-45 | 4K Video Camera | 4419739028 79053935 | Critical | 172.29.80.65: 12345 | Host 1 |
| Device 4 | | | | | | |
| | 00-17-32-61-25-25 | 4K Monitor | 4589729028 77553921 | Low | 189.36.51.22: 67890 | Host 2 |

1000A ← Device 1 row group
1000B ← Device 4 row group

Stored in Registry

FIG. 5

| | | | |
|---|---|---|---|
| Critical Priority | Back Off time | Ran(0,0.5) secs | |
| | Retry Period | Ran(0,0.3) secs | |
| | Delay | 0 secs | |
| High Priority | Back Off time | Ran(0.1,0.7) secs | |
| | Retry Period | Ran(0,0.5) secs | |
| | Delay | 0.2 secs | |
| Medium Priority | Back Off time | Ran(0.3,0.9) secs | |
| | Retry Period | Ran(0,0.7) secs | |
| | Delay | 0.4 secs | |
| Low Priority | Back Off time | Ran(0.5,1.4) secs | |
| | Retry Period | Ran(0,0.9) secs | |
| | Delay | 0.6 secs | |

FIG. 6

DEVICE, COMPUTER PROGRAM AND METHOD

BACKGROUND

Field of the Disclosure

The present technique relates to a device, computer program and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

In computer networks, many end-point devices (sometimes called devices, end-points, nodes, resources or the like) all communicate with one another.

In order to communicate over the network, the device first must register on the network. This may be achieved through using a network registry which is a repository detailing all the devices located on the network, or using a peer-to-peer mechanism.

In modern networks, such as in IoT networks or in a network within a broadcast studio, there may be many hundreds or thousands of devices attached to the particular network. In the event of a power outage or a failure within the network, the devices on the network become de-registered with the network. This means that when the power is restored or the component causing the failure within the network is replaced, all the devices must re-register on the network.

This causes a problem. During the first few moments of a network restarting, all the many hundreds or thousands of devices will try and re-register on the network at the same time. This causes congestion within the network and many devices will fail to re-register on the network on their first attempt. Therefore, contention techniques such as back-off are used to reduce the risk that all devices will attempt to re-register at the same time.

However, in many networks, certain crucial devices being off the network may have dangerous consequences. For example, in a hospital, having a ventilator off of the network for a prolonged period may endanger the life of patients in surgery, or in a broadcast studio, certain devices are crucial to restoring the proper function of the broadcast studio which allows the broadcast studio to get back "on-air" as soon as possible.

It is an aim of the disclosure to address the issue of registering these crucial devices on the network more quickly.

SUMMARY

According to a first aspect, there is provided a method of joining a first device and a second device with a network, the method comprising: joining a first device with the network and subsequently joining a second device with the network, where a priority level for joining with the network associated with the first device is higher than the priority level for joining with the network associated with the second device.

According to a second aspect, there is provided a method of joining devices with a network, the method comprising: joining each device with the network in a priority order.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 4 to 6 show data structures according to embodiments of the disclosure;

DESCRIPTION OF THE EMBODIMENTS

Figure 1:
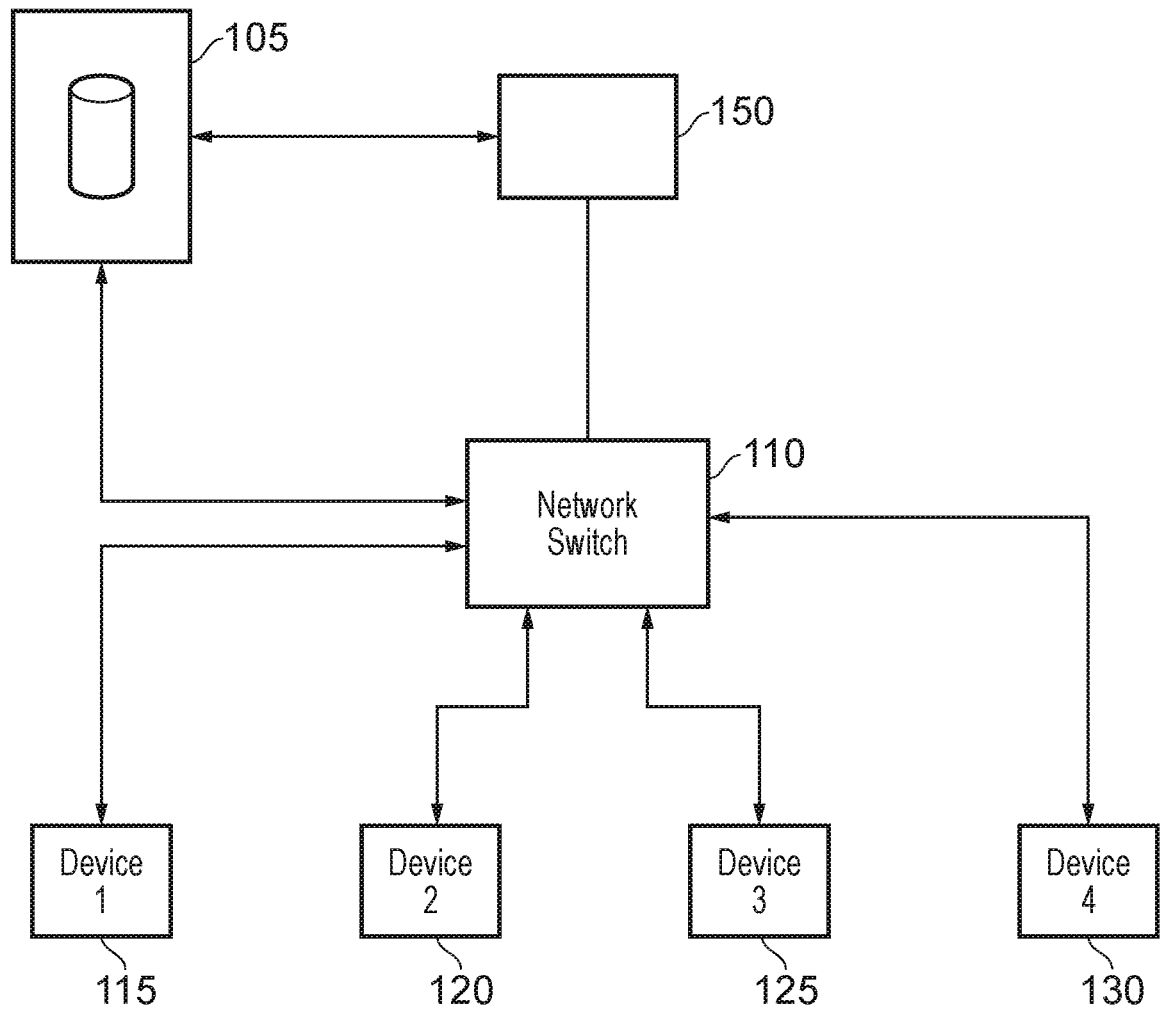
FIG. 1 shows a network according to embodiments of the present disclosure.

Referring now to the drawings, wherein like reference numerals designate identical or corresponding parts throughout the several views.

FIG. 1 shows a network 100 according to embodiments of the disclosure. In the network 100, a network switch 110 is shown. The network switch 110 routes data packets around the network 100. The network switch 110 is connected to four devices; device 1 115, device 2 120, device 3 125 and device 4 130. Of course, the network switch 110 may be connected to more or less devices. Additionally connected to the network switch 110 is a registry 105. The registry 105 stores details of the devices registered on the network 100 as will be explained later. It would be appreciated that although only a single registry is shown, the functionality of the registry may be provided over a plurality of federated or clustered registries. It will also be appreciated that the registry 105 is one example of a registration device and that any other kind of registration device which enables a device to connect on a network is envisaged. Further, although only a single switch is shown, the network functionality may be provided by more than one switch, router or other networking equipment.

In the following embodiments, the network 100 is a network in a broadcast studio and the devices are various components within the broadcast studio. In the specific example embodiments, device 1 115 is a video camera which captures 4K content, device 2 120 is a video camera that captures 8K content, device 3 125 is a production monitor being viewed by a director of a program and device 4 130 is an editing monitor being viewed by a program editor.

In embodiments, the network 100 is shown with a client 150. The client 150 is connected to the network switch 110 and is used to control the devices that may be connected to the network 100. For example, the client 150 controls priority information that may be applied to each device on the network as will be explained later. The client 150 may include a user interface using which the priority for the devices on the network 100 is set.

However, it should be noted that the disclosure is not so limited. Firstly, the four devices may be any type of device connected to a network in a broadcast studio. For example, the devices may be any kind of networked media device. In other embodiments, a device may include the functionality of more than one device or media node. For example, a device may also include a function within a device. For example, a device may include a sender of data, receiver of data, data source or the like.

Secondly, the network 100 may be any kind of network such as a network in a hospital, school, power station, office, home or the like. Indeed, the network 100 may take any form and may be a wired network using Ethernet or a wireless network such as a WiFi network conforming to IEEE 802.11a/g or the like such as a mobile communication network conforming to any of the 3GPP standards, for example Release 14 or Release 15. Moreover, the network may be an Internet of Things (IoT) network. For example, the network switch 110 may be an Infrastructure to Vehicle network and the device in this case would be a vehicle or part of the vehicle's systems.

After a failure of network 100, all the devices located on the network 100 will re-register on the network 100. In other words, when the network 100 connectivity is restored, each device within the network 100 will need to re-register on the network. The mechanism for registration according to embodiments of the disclosure will be described with reference to FIG. 3.

Figure 2:
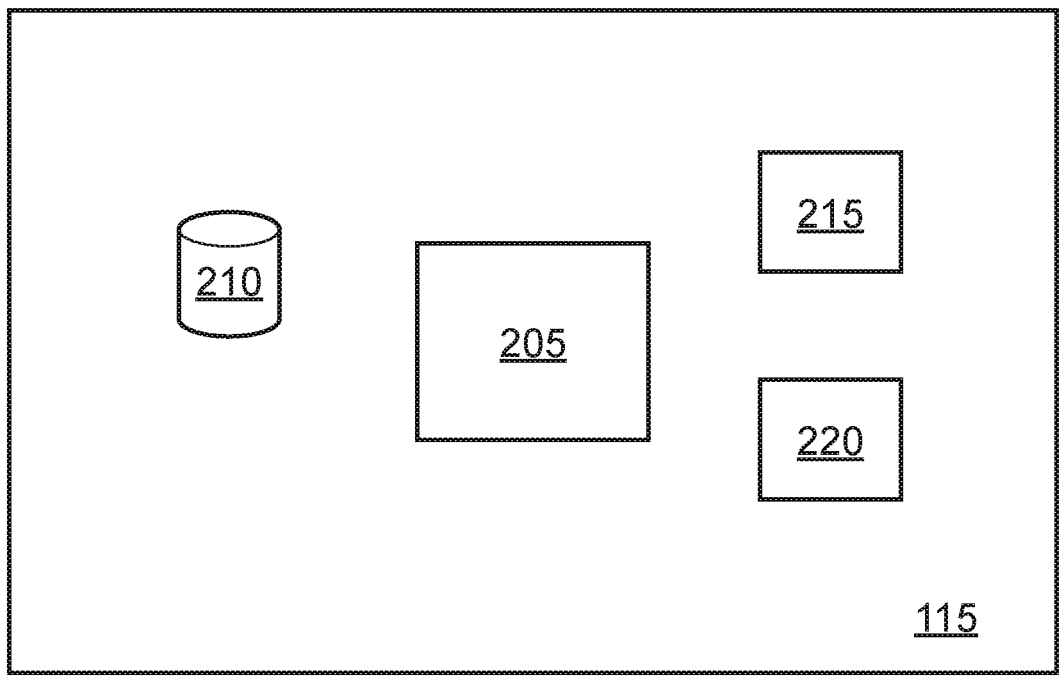
FIG. 2 shows a block diagram of a device in the network according to embodiments of the present disclosure

Referring to FIG. 2, a block diagram of device 1 115 is shown. The other devices (device 2, device 3, device 4) will have similar arrangements but device 1 is shown and described for brevity.

The device 1 115 is controlled by control circuitry 205. The control circuitry 205 is, in embodiments, semiconductor circuitry which operates under the control of computer software to perform certain functions. The software is computer readable code that is stored in storage 210. Additionally provided in device 1 115 is receiver circuitry 215. The receiver circuitry 215 is circuitry that operates as a networked media receiver to receive data over the network 100. Finally, device 1 has also provided source circuitry 220 which is circuitry that operates as a source of data for the network 100.

Device Registration

Figure 3:
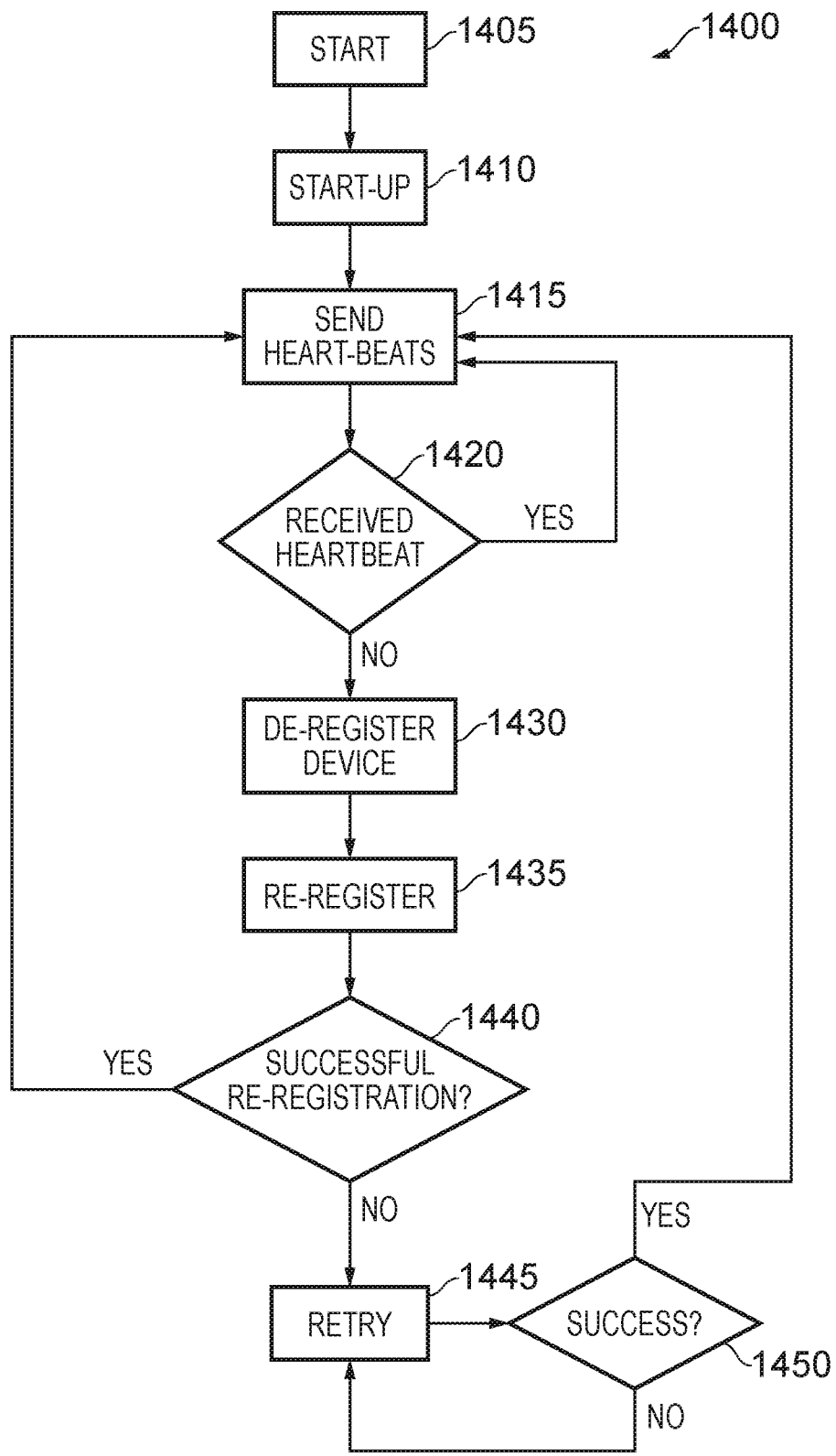
FIG. 3 shows a flow chart for registering devices on a network.

FIG. 3 shows a process 1400 for device registration according to embodiments. The process 1400 starts at step 1405. The process then moves to step 1410 where a device wishing to connect to the network follows a start-up routine to join the network. This routine involves registering on the network or in some way joining the network.

In the case of registering on the network, the device wishing to join the network 100 sends a Request to the registry 105. This Request may include a priority level attributed to the device. This priority level will be explained later. Once the device has been registered within the Registry, the Registry 105 sends a Response to the device acknowledging that the device is registered on the network.

The process then moves to step 1415 where the device sends a periodic heartbeat to the registry to maintain its registration on the network 100. The process moves to step 1420 where a check is performed on the registry 105 to determine that a heart-beat is received at the registry 105. In the event that a heart-beat is received, the "yes" path is followed to step 1425, where the process returns to step 1415 for the next heartbeat.

However, if no heart-beat is received, the "no" path is followed to step 1430 where the device is de-registered from the network 100. In order to communicate data over the network again, the device must join the network again. This occurs in step 1435.

In the event that the device attempts to re-join the network (by re-registering for example), a check is made in step 1440 to determine whether the attempt has been successful. In the event of a successful re-registration, the "yes" path is followed to step 1415. However, in the event of an un-successful attempt, the "no" path is followed to step 1445 where the re-registration attempt is retried. This may mean the device that fails re-registration may back-off for a fixed amount of time and then retry.

The process moves to step 1450 where a check is made to determine whether the retry attempt was a success. In the event that the retry attempt was successful, the "yes" path is followed and the device joins the network (for example by registering with the network). The process then moves to step 1415 where the periodic heart beats are sent periodically to maintain the device registration.

In the event that the retry attempt was un-successful, the "no" path is followed back to step 1445.

In large networks, this causes a problem addressed by embodiments of the disclosure. Specifically, in the event of a large network, and in the event of a recovery of the network from an outage (such as a power outage or planned outage) where a large number of devices need to communicate with the network at the same time, all the devices will attempt to contact the appropriate registry 105 simultaneously. This means that the risk of device collision (i.e. two different devices trying to register on the network at the same time) is increased. Therefore, a device that must be available on a network quickly may be delayed in its registration. Of course, the disclosure is not so limited and a large number of devices may need to communicate with the network at the same time for other reasons.

Therefore a modified mechanism according to embodiments of the disclosure is provided.

This method describes joining a first device and a second device with a network, and comprises joining a first device with the network and subsequently joining a second device with the network, where a priority level for joining with the network associated with the first device is higher than the priority level for joining with the network associated with the second device. In other words, there is described a method for joining devices with a network, the method comprising joining each device with the network in a priority order.

In some embodiments, a priority associated with the device may be provided to the registry 105 during the start-up process of step 1010. This priority defines the temporal importance of joining the device to the network 100. In other words, the priority level provides an indication of how important it is to join the device to the network quickly.

In embodiments, the priority level may be defined as "critical". This means that it is of critical importance to register a device (such as device 1 115) on the network 100 quickly. So, in the event of a broadcast studio network, device 1 115 may be a 4K camera that is used in the studio to capture content of a presenter currently on air. Therefore in the event of a failure within the network, it is of critical importance to get the device 1 115 registered with the network 100 as quickly as possible so that the content may be captured and sent to air as quickly as possible.

In some instances, there may be a prescribed order in which devices should be registered on the network. For example, in the instance where device 1 is a 4K camera, in order for the content captured by the 4K camera to be sent over the network 100, a network interface to which the 4K camera is connected will need to be registered with the network 100. Therefore, both the network interface and the 4K camera have critical priority, but it is desirable to register the network interface with the network 100 before device 1 115 is registered with the network 100. This will reduce the likelihood of an error occurring in the device when trying to send content over the network.

This means that the priority level may indicate a relative priority compared to a different device. For example, if three devices on the network are to be registered with critical priority, but device 3 should be registered first, device 1 registered second and device 2 registered third, the priority for device 3 may read "critical; 1", the priority for device 1 may read "critical; 2" and the priority for device 3 may read "critical; 3".

Of course, any other priority level may be defined such as "low", "high" or the like. Furthermore, the priority level may be given a numeric range such as "1", "2" or the like.

Control of Registration of the Devices

As noted above, according to embodiments of the disclosure, the devices should join to the network in priority order. This control of registration may be performed by the devices themselves trying to register on the network in a priority order, or may be performed by one or more network components with which the device communicates. In other words, the control of registration may be performed by a router or network controller or other component which controls the data flow around the network.

At the Device

As noted above, it is possible that the devices themselves are allocated the priority level whilst on the network. This may be allocated by the network itself or may be allocated by a user of the device or an administrator.

In the case where the user of the device allocates the priority level, the priority level will be provided using a user interface. Although the following examples may be changed by a user, it is envisaged that in embodiments, the priority level will be allocated by the network itself for example using a network controller which is monitoring the network.

In embodiments, the priority level will be allocated when the network is functioning correctly. The priority level will be stored within the device storage 210. By storing the priority level on the device in this manner, in the event of a failure of the network, the device will retain the priority level given to that device prior to the failure of the network.

A data structure 900 (such as a database) showing the information stored in the storage 210 of device 1 is shown in FIG. 4. In data structure 900 the MAC address of the device is provided. Further, the device type, software serial number, IP address and label are stored. In addition, the priority level associated with the device is stored. In the example of FIG. 4, device 1 is a 4K video camera having a priority level of critical.

It is envisaged that the priority level may be changed. The priority level may change for many reasons. For example, the network topology will change over time and so a different device may be installed on the network that has a higher temporal importance than the existing device. Therefore, the priority level of the existing device will be reduced.

In addition, the priority level of a device may change due to the use of the device. In this example, if the device is a 4K camera used to capture live video of a presenter of a program, the priority level associated with the device may be very high due to that camera being used to capture the content being broadcast. However, after the program has ceased to be broadcast, the priority level associated with the camera may be reduced. As a further example, the priority level of the device may change depending upon the type of data which is produced or consumed by the device. In this case, the device may be an editing device whose output is broadcast. This device will consume audio/video data and will output audio/video data. In other words, the device will input a plurality of audio/video data streams and will output a single audio/video data stream which is broadcast. Accordingly, the network establishes that devices which have a plurality of input audio/video data streams and a single output audio/video data stream should have a high priority level.

It is possible that the device may establish its own priority level based on one or more criteria provided by the network. These criteria may be provided by the network to each device. In one example, the criteria will be broadcast over the network to all of the devices located on the network. The criteria may be of a form similar to table 1, below.

TABLE 1

| Example Criteria Provided to Device | |
|---|---|
| Type of Device | Priority |
| 4K camera; editing console | Critical |
| Boom control; network switch in studio | High |
| Production headset | Medium |
| electronic clapper | Low |

In table 1, the device knows the type of device it is and will then be able to select the correct priority. This mechanism for setting the device priority is advantageous because the same information is provided to each device and so each device is kept up to date.

Of course, table 1 is only one example of criteria provided to the device. In other instances, the criteria may include the type of data consumed or provided by the device. For example, all devices that output audio/video data may require a high priority level.

The registry entry stored within the network also maintains the priority level associated with each device. An example of such a registry entry is provided in FIG. 5. In FIG. 5, a data structure 1000 (such as a database) is stored. Within the data structure 1000, an entry 1000A for device 1 and an entry 1000B for device 4 are provided. As will be apparent, the entry 1000A in the registry for device 1 is the same as that stored on device 1 explained with reference to FIG. 4. A similar entry 1000B is provided for device 4 except the priority level associated with device 4 is a low priority. In embodiments, the entry 1000B stored within the registry for device 4 will be also stored within device 4 130 on the network.

Mechanisms for Registering with Network Depending on Device Priority

The mechanisms for allocating different priority levels to the devices have been described. The purpose of the priority level is to allow the devices with the higher priority levels to be registered on the network more quickly than those devices with a lower priority level. In other words, the devices are registered on/join the network in a priority order.

This ensures that temporally important devices are operational on the network before less temporally important devices.

Mechanisms for registering the device with the network based on the priority level will now be described.

In embodiments, each priority level is assigned to one or more registration attempt setting. In other words, each priority level defines one or more setting for an attempt that the device will make in registering with the network. In embodiments, the setting will be a delay to be applied to the registration request being sent from the device to the registry. FIG. 6 shows a data structure 1100 (such as a database) that defines the registration settings associated with each priority level. This data structure 1100 may be provided to each device on the network for storage therein. In other words, the registration settings for one or more different priority levels may be provided to each device. This allows the device to adopt the appropriate registration settings when the priority level is changed without those settings being separately provided. Of course the disclosure is not so limited and, for example, only the registration settings for the priority level associated with the device may be provided to the device. These registration settings may be provided to the device when the priority level is provided to the device.

Within data structure 1100, registration settings 1100A for critical priority, registration settings 1100B for high priority, registration settings 1100C for medium priority and registration settings 1100D for low priority levels are shown.

As noted above, each of the registration settings defines one setting for an attempt that the device will make in registering with the network. In the example of FIG. 6, the registration settings are back-off time, retry period and delay. It should be noted here that any one or more than one of these registration settings may be used to assist in ensuring the devices are registered according to the priority level allocated to the device.

The back-off time is a term of art and is the time which a device waits before re-transmitting the same packet of data in the event that the transmission of the original packet collided with a data packet from a different device. The retry period is a term of art and is the time a device waits before re-transmitting the same packet of data in the event that an acknowledgment from the destination device is not received. Finally, the delay is a period of time after the network becomes operational again that the device will wait before attempting to register with the network.

As it is important to register the devices with a "critical" priority as quickly as possible after the delay, the back-off time and retry period are the lowest time periods of any of the priority levels. This is shown by the fields within structure 1100A. In the example embodiments of FIG. 6, the back-off time is a randomly selected period of time between 0 and 0.5 seconds. In other words, the back-off time is bounded by the time period 0 and 0.5 seconds. Further, the retry period is a randomly selected period of time between 0 and 0.3 seconds. In other words, the retry period is bounded by the time period 0 and 0.3 seconds. There is no delay in attempting to register with the network.

It is useful to set a random time to reduce the likelihood of all of the devices having critical priority trying to connect to the network at the same time. This will reduce the likelihood of collisions occurring in the registration attempts.

Those devices with a "high" priority level should be registered quickly after the network becomes operational again (but generally should be registered after the devices having critical priority). The data structure 1100B associated with devices with a "high" priority level is shown in FIG. 6. In this case, the back-off time is a randomly selected period of time between 0.1 and 0.7 seconds. In other words, the back-off time is bounded by the time period 0.1 and 0.7 seconds. The retry period is a randomly selected period of time between 0 and 0.5 seconds after the delay. In other words, the retry period is bounded by the time period 0 and 0.5 seconds. In this case, the back-off time is a minimum of 0.1 seconds so that should a collision occur with a device having a critical priority, it is likely that the device having critical priority would attempt to re-transmit the request to register prior to the device having a high priority.

This collision avoidance is further enhanced by applying the delay of 0.2 seconds after the network becomes operational again to any retransmission attempt.

The devices with a "medium" priority level should be then registered with the network (these should generally be registered after the devices having high priority). The data structure 1100C associated with devices with a "medium" priority level is shown in FIG. 6. In this case, the back-off time is a randomly selected period of time between 0.3 and 0.9 seconds and the retry period is a randomly selected period of time between 0 and 0.7 seconds after the delay. In this case, the back-off time is a minimum of 0.3 seconds so that should a collision occur with a device having a high priority, it is likely that the device having high priority would attempt to re-transmit the request to register prior to the device having a medium priority level. This collision avoidance is further enhanced by applying the delay of 0.4 seconds after the network becomes operational again to any retransmission attempt.

The devices with a "low" priority level should be then registered with the network (these should generally be registered after the devices having medium priority). The data structure 1100D associated with devices with a "low" priority level is shown in FIG. 6. In this case, the back-off time is a randomly selected period of time between 0.5 and 1.4 seconds and the retry period is a randomly selected period of time between 0 and 0.9 seconds after the delay. In this case, the back-off time is a minimum of 0.5 seconds so that should a collision occur with a device having a medium priority, it is likely that the device having medium priority would attempt to re-transmit the request to register prior to the device having a low priority level. This collision avoidance is further enhanced by applying the delay of 0.6 seconds after the network becomes operational again to any retransmission attempt.

Although the above describes bounding the retry period and/or the back off time to certain times, the disclosure is not so limited. For example, in the case of an exponential back-off being used, the boundary values at each retry attempt would change as would be appreciated by the skilled person. In this case, the times noted above may be a starting time period which may change for each re-try attempt.

It would be appreciated that application of any one of these registration settings would avoid the risk of collision and would also enable higher priority devices to send a request for registration earlier than lower priority devices. This would increase the likelihood of higher priority devices registering with the registry more quickly. Moreover, it is noted that the various back-off and retry times do not need to be randomly selected to improve the speed at which temporally important devices register and connect to the network.

The purpose of the registration settings is to apply a delay to the transmission of the registration request; the delay corresponding to the priority level associated with the device. In other words, the delay corresponds to the priority of the device. This means that, in the embodiments of FIG. 6, a delay corresponding to the priority of the device is applied to the registration request sent from the device to the registry.

It is possible that the priority level associated with a device is unknown. For example, the device may have failed during the network outage and so the priority level may be unknown at the time of re-establishing connection of the network. In the instance of the device having an unknown priority level associated with it, one or more randomised registration settings may be applied to the device. This will avoid all devices attempting to register with the network at the same time and so will reduce the likelihood of collision during the registration process. This will result in devices registering more quickly with the network.

It is possible that the network, when operational again, may have a different network topography compared with the network prior to failure. This may be caused for several reasons. For example, only a part of the original network may become operational again. This means that the priority associated with each device prior to the network failure may be different to the priority of the device within the new, different, network.

In the case where the topography (or identity) of the network has changed, a default priority may be applied to the device. This may be applied by a broadcast update across the network using DNS-SD or the like. Alternatively, the default setting may be stored within storage 210 and may be applied when a different network ID is detected by the device as the network becomes operational again. The default priority may be associated with a particular device type. For example, all 4K cameras may be allocated a "critical" priority level whereas all monitors are allocated a "low" priority level. Of course, other criteria for allocating the default priority are envisaged such as location of the devices. In this case, all devices within a studio or production suite may be allocated a default critical priority level, whereas other devices such as those located in a reception area may be allocated a low priority. This is because it may be more appropriate to connect quickly certain areas to the network to become operational again.

The default priority level may be associated with default registration settings. In other words, the data structure 1100 of FIG. 6 may be stored within each device and when the network becomes operational again, and the network identity is different, the device may refer to the data structure of FIG. 6 to determine the appropriate registration settings. Although the entire data structure 1100 of FIG. 6 may be stored, the disclosure is not so limited. In some instances, the appropriate data structure 1100A, 1100B or 1100C may be stored within the device. This reduces the storage required within the device.

Figure 7:
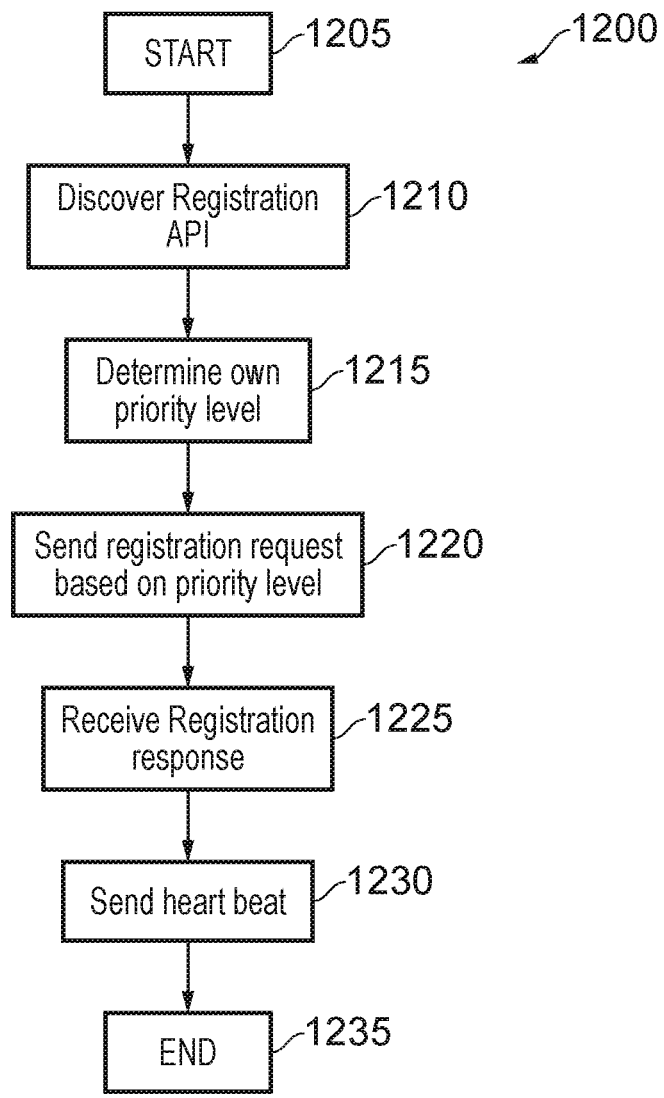
FIG. 7 shows a flow chart explaining a process associated with the device registration according to embodiments.

FIG. 7 shows a flow chart explaining a process 1200 associated with the device registration according to embodiments. This process 1200 is carried out within the device. The process 1200 starts at step 1205. The process then moves to step 1210 where a registration (Application Programming Interface) API is discovered by the device. As will be appreciated, the registration API is an API hosted by the registry 105 to allow devices to register on the network. After the registration API has been discovered, the device determines its own priority level 1215. This may include referring to the priority level stored within storage 210 that has been allocated or refers to the default priority level. As noted above, associated with the priority level are registration settings. Based upon the registration settings, the registration request is sent to the registry 200 at an appropriate time determined by the registration settings. This is step 1220.

After the device has been registered on the network, the registry 200 sends a registration response. This registration response is received by the device in step 1225. The device then sends the heart beat to the registry in step 1230 and the process ends in step 1235. It should be noted that the heart-beats are sent periodically whilst the device is registered with the network.

Figure 8:
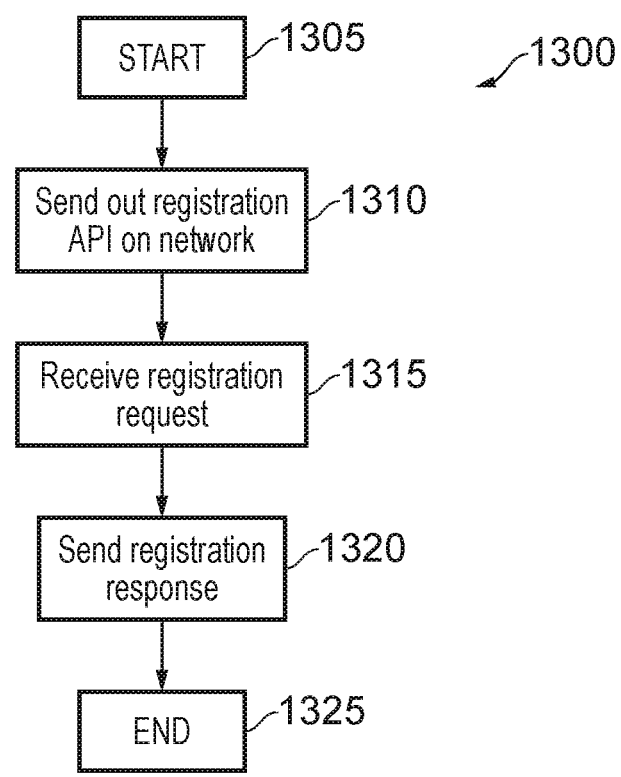
FIG. 8 shows a flow chart explaining a process associated with the device registration according to embodiments that is carried out at the registry.

FIG. 8 shows a flow chart explaining a process 1300 associated with the device registration according to embodiments that is carried out at the registry. The process 1300 starts at step 1305. The process then moves to step 1310 where the registration API and possibly the network ID is broadcast over the network. The registration request sent from each device on the network is then received by the registry in step 1315. These will, generally, be received in priority order given the registration settings applied by the devices. For each registration request, a registration response is sent after registration of the device has taken place. This is step 1320. The process then ends in step 1325.

Although the above describes the devices themselves controlling when they send the registration requests to the registry, the disclosure is not so limited.

In other embodiments, components that route data around the network (or part of the network) may assist in controlling the registration of devices with the registry. These may be used in conjunction with the embodiments described above, or may be used independently of the embodiments described above. In other words, the network components may be configured such that the devices do not send the registration requests in accordance with the priority level (i.e. the devices send the registration requests at any time) or may be configured to apply further processes to the registration requests sent by the device in priority order using the techniques described above.

In embodiments, different parts of the network may have different priorities. For example, the network may be split into different logical parts (for example a VLAN); each logical part having a different priority level. In this case, the logical part of the network having a higher priority level will be made operational more quickly. In other words, a priority level is applied to different parts of the network (for example different logical parts of the network) and the parts of the network will be made operational in a priority order. In embodiments, the devices having a certain priority level will be connected to a logical part of the network having the same priority level. In other words, a device having a critical priority level will be connected to a logical part of the network also having a critical priority level. Similarly, a device having a low priority level will be connected to a logical part of the network also having a low priority level. The different parts of the network have a priority level and registration settings as explained above. This allocation of devices to parts of the network having corresponding priority levels allows devices having a high priority level to become operational even quicker.

In a similar manner, devices may be allocated to network components such as switches or ports within a switch based on priority level. In this case, switches or ports within a switch are allocated to devices based on the priority level of the device. The switches (or ports) are then connected to the network in that priority order. So, in this case, devices having a critical priority level are allocated to a switch (or a port within a switch) also having a critical priority. The switch (or ports) then join the network and become operational as quickly as possible using the priority registration techniques described above.

In embodiments, instead of the entire switch having the same priority level, certain ports within the switch may have different priority levels. The devices are then allocated to the respective port in the switch having the same priority level. For example, a device having a critical priority level is allocated to a port in a switch having a critical priority level. Therefore, that port within the switch is connected to the network in accordance with the priority level associated with it in a similar manner to that described above with respect to the device. This configuration allows load balancing and ensures that if a switch having a critical priority becomes non-operational, a large number of critical devices are not all removed from the network.

The ports and switches may be manually configured or may detect the priority levels of the devices connected to the ports within the switch. In the case that the priority levels are detected, when the priority level associated with a device changes, the priority level of the switch or the port within the switch also changes. This ensures that the switch and device have associated priority levels and ensures that devices are connected to the network more quickly.

In embodiments, instead of using the priority level of the device to determine the priority level of the switch or port within the switch, it is possible to determine the priority of the port or switch based on the amount of data or the type of data passing through the switch or port of the switch. For example, where switches or ports in a switch have large amounts of data compared with other switches or ports within a switch, the switch or port within a switch will be allocated a high priority. In other words, the priority level allocated to a switch or port within a switch corresponds to the amount of data passing through the switch or port within a switch. Similarly, the priority level attributed to the switch or port within a switch may be determined by the type of data passing through that switch or port within the switch. For example, a high priority level may be allocated to a switch or port within a switch where real-time data (such as audio/video data) or the like passes through that switch or port within the switch. Additionally, the frequency that data is passing through the port of the switch may be used to determine the priority level of the port or switch. In this instance, the more regularly a device connected to the port of the switch communicates over the network, the higher the priority level attributed to that port in the switch.

This means that the switch (or other network component) does not need to know the priority level of the devices connected to it. The network component only needs to analyse the data passing through the network component to establish its priority level. This analysis of data may be performed using known techniques or other, Artificial Intelligence, techniques.

Although the above describes connecting to a network using a registry, it is envisaged that the devices may connect to the network using a peer-to-peer mechanism.

It should be noted that audio/video data encompasses audio and/or video data. Although the foregoing describes audio/video data, the disclosure is not so limited and any kind of data such as image data or the like is envisaged.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:
1. A method of joining a first device and a second device with a network, the method comprising:
    joining a first device with the network and subsequently joining a second device with the network, where a priority level for joining with the network associated with the first device is higher than the priority level for joining with the network associated with the second device.
2. A method according to clause 1, wherein the joining step comprises: sending a registration request to a registration apparatus that registers devices on the network.
3. A method according to clause 2, comprising: applying a time delay to the registration request from the first device that is less than a time delay applied to the registration request from the second device.
4. A method according to clause 2 or 3, comprising: applying a back-off time period and/or retry time period to the registration request from the first device that is less than a back-off time period and/or retry time period applied to the registration request from the second device.
5. A method according to clause 4, comprising: bounding, in accordance with the priority level associated with the first and second device, the back-off time period and/or retry time period in a range of time periods; and randomly generating the back-off time period and/or retry time period within the boundary.
6. A method according to clause 5, comprising: changing the boundary in accordance with the number of retry attempts.

7. A method according to any preceding clause, wherein the priority level in the first and the second device is defined by a user of the respective device.
8. A method according to any one of clause 1 to 6, wherein the priority level in the first and the second device is defined by the network.
9. A method according to clause 8, wherein the priority level is determined in accordance with the data communicated with the network by the first and/or second device.
10. A method according to any preceding clause wherein the priority level is determined by the identity of the first and second device.
11. A method according to any preceding clause, comprising storing the priority level within the first device and the second device.
12. A method according to any preceding clause, comprising assigning a first network component to communicate with the first device and a second network component to communicate with the second device, wherein the priority level associated with registering the first network component on the network is higher than the priority level associated with registering the second network component on the network.
13. A method according to clause 12, wherein the first network component and the second network component are network switches.
14. A method according to clause 12, wherein the first network component and the second network component are ports within a network switch.
15. A method according to any preceding clause, wherein the step of joining is in response to the network recovering from a failure.
16. A method according to clause 15, wherein the failure is caused by a power outage or a planned outage.
17. A method of joining devices with a network, the method comprising:
joining each device with the network in a priority order.
18. A computer program product comprising computer readable instructions which, when loaded onto a computer, configures the computer to perform a method according to any preceding clause.
19. A device for joining a first device and a second device with a network, the device comprising circuitry configured to:
join a first device with the network and subsequently joining a second device with the network, where a priority level for joining with the network associated with the first device is higher than the priority level for joining with the network associated with the second device.
20. A device according to clause 19, wherein the joining step comprises: sending a registration request to a registration apparatus that registers devices on the network.
21. A device according to clause 20, wherein the circuitry is further configured to: apply a time delay to the registration request from the first device that is less than a time delay applied to the registration request from the second device.
22. A device according to clause 20 or 21, wherein the circuitry is configured to: apply a back-off time period and/or retry time period to the registration request from the first device that is less than a back-off time period and/or retry time period applied to the registration request from the second device.
23. A device according to clause 22, wherein the circuitry is configured to: bound, in accordance with the priority level associated with the first and second device, the back-off time period and/or retry time period in a range of time periods; and randomly generating the back-off time period and/or retry time period within the boundary.
24. A device according to clause 23, wherein the circuitry is configured to: change the boundary in accordance with the number of retry attempts.
25. A device according to any one of clause 19 to 24, wherein the priority level in the first and the second device is defined by a user of the respective device.
26. A device according to any one of clause 19 to 24, wherein the priority level in the first and the second device is defined by the network.
27. A device according to clause 26, wherein the priority level is determined in accordance with the data communicated with the network by the first and/or second device.
28. A device according to any one of clause 19 to 27 wherein the priority level is determined by the identity of the first and second device.
29. A device according to any one of clause 19 to 28, wherein the circuitry is configured to store the priority level within the first device and the second device.
30. A device according to any one of clause 19 to 29, wherein the circuitry is configured to: assign a first network component to communicate with the first device and a second network component to communicate with the second device, wherein the priority level associated with registering the first network component on the network is higher than the priority level associated with registering the second network component on the network.
31. A device according to clause 30, wherein the first network component and the second network component are network switches.
32. A device according to clause 30, wherein the first network component and the second network component are ports within a network switch.
33. A device according to any one of clause 19 to 32, wherein the step of joining is in response to the network recovering from a failure.
34. A device according to clause 33, wherein the failure is caused by a power outage or a planned outage.
35. A device for joining devices with a network, the device comprising circuitry configured to:
join each device with the network in a priority order.

The invention claimed is:
1. A method of joining a first device and a second device with a network, the method comprising:
joining a first device with the network and subsequently joining a second device with the network, wherein a priority level for joining with the network associated with the first device is higher than a priority level for joining with the network associated with the second device, and the joining step further comprises sending, from the first device a first registration request to a registration apparatus that registers devices on the network, and sending, from the second device, a second registration request to the registration apparatus;
applying a first waiting period, being one of a back-off time period and a retry time period, to the first registration request, the first waiting period being shorter than a second waiting period applied to the second registration request;

setting respective upper and lower boundaries for the first waiting period and the second waiting period, in accordance with the priority level associated with the first and second devices;

randomly generating a first waiting time within the first waiting period; and changing the upper and lower boundaries of the first waiting period for each subsequent retry attempt, wherein the method further comprises storing the priority level of the first device within the first device and storing the priority level of the second device within the second device, and storing a table indicating both the first waiting period and the second waiting period in both of the first and second devices.

2. The method according to claim 1, wherein the priority level of each of the first device and the second device is defined by a respective user of the respective device.

3. The method according to claim 1, wherein the priority level of each of the first device and the second device is defined by the network.

4. The method according to claim 3, wherein the priority level of each of the first device and the second device is determined in accordance with data communicated with the network by the respective device.

5. The method according to claim 1, wherein the priority level of each of the first device and the second device is determined by an identity of the first and the second device.

6. The method according to claim 1, further comprising assigning a first network component to communicate with the first device and a second network component to communicate with the second device, wherein a priority level associated with registering the first network component on the network is higher than a priority level associated with registering the second network component on the network.

7. The method according to claim 6, wherein the first network component and the second network component are network switches.

8. The method according to claim 6, wherein the first network component and the second network component are ports within a network switch.

9. The method according to claim 1, wherein the step of joining is performed in response to the network recovering from a failure.

10. The method according to claim 9, wherein the failure is caused by a power outage or a planned outage.

11. A computer program product comprising a non-transitory computer readable medium storing instructions which, when loaded onto a computer, configures the computer to perform the method according to claim 1.

12. A device for joining a first device and a second device with a network, the device comprising:
circuitry configured to
join a first device with the network and subsequently joining a second device with the network, where a priority level for joining with the network associated with the first device is higher than a priority level for joining with the network associated with the second device, wherein the joining step comprises sending, from the first device, a first registration request to a registration apparatus that registers devices on the network, and sending, from the second device, a second registration request to the registration apparatus;

apply a first waiting period, being one of a back-off time period and a retry time period, to the first registration request, the first waiting period being shorter than a second waiting period applied to the second registration request;

setting respective upper and lower boundaries for the first waiting period and the second waiting period, in accordance with the priority levels associated with the first and second devices:

randomly generating a first waiting time within the first waiting period; and change the upper and lower boundaries of the first waiting period for each retry attempt of a plurality of retry attempts, wherein the circuitry is further configured to cause to be stored, the priority level of the first device within the first device and storing the priority level of the second device within the second device, and cause to be stored, a table indicating both the first waiting period and the second waiting period in both of the first and second devices.

13. The device according to claim 12, wherein the priority level of each of the first device and the second device is defined by a user of the respective device.

14. The device according to claim 12, wherein the priority level of each of the first device and the second device is defined by the network.

15. The device according to claim 14, wherein the priority level of each of the first device and the second device is determined in accordance with data communicated with the network by the respective device.

* * * * *